Jan. 25, 1949. J. W. DAWSON 2,459,795
METHOD AND APPARATUS FOR ELECTRIC WELDING
Filed June 4, 1945
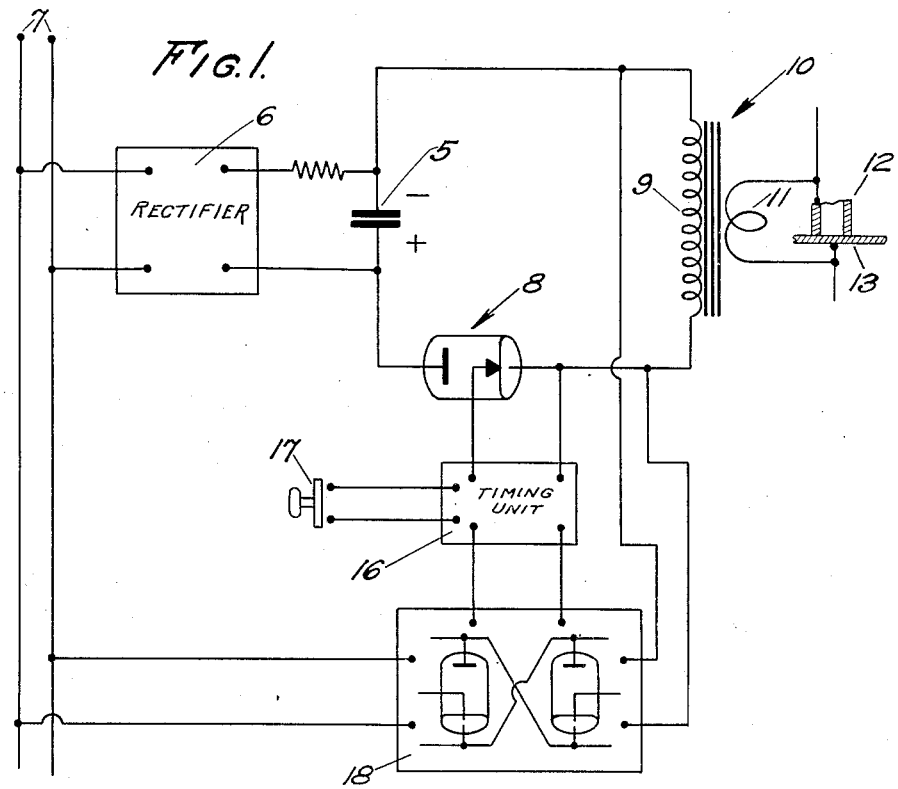
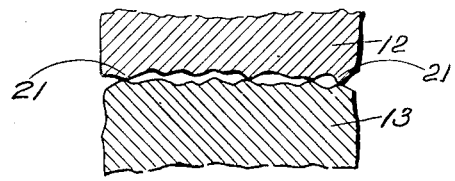
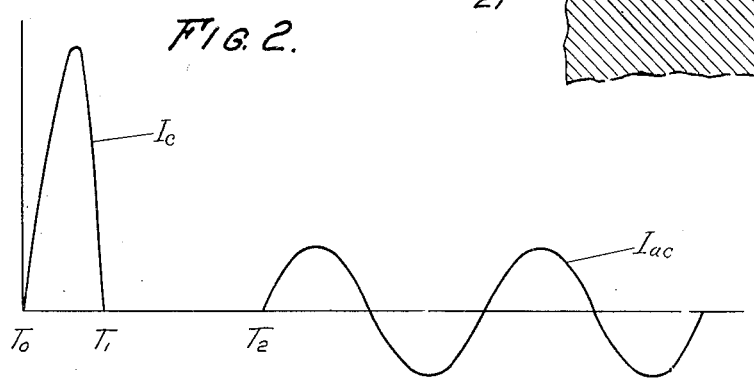
INVENTOR.
JOHN W. DAWSON,
BY Elmer J. Gorn
ATTY.

Patented Jan. 25, 1949

2,459,795

UNITED STATES PATENT OFFICE 2,459,795

METHOD AND APPARATUS FOR ELECTRIC WELDING

John W. Dawson, West Newton, Mass., assignor to Raytheon Manufacturing Company, Newton, Mass., a corporation of Delaware Application June 4, 1945, Serial No. 597,421

5 Claims. (Cl. 219—4)

This invention relates to an electric welding system, and more particularly to a resistance welding system.

Where two parts, such as a steel tube and a steel plate, are to be welded together over a comparatively large area by resistance welding, the passing of an A.-C. current through said members often results in current concentration and burning in local areas. Such current concentration and concomitant burning in local areas is largely due to the nature of the contacting surfaces over which the weld is to be effected. In an endeavor to mitigate this effect, it is a common practice to machine the surfaces at which the weld is to be made in an attempt to avoid the presence of high points projecting from one or the other of such surfaces and at which the welding current tends to concentrate. However, even after the surfaces have been smoothed as far as practical, microscopic projections continue to exist at which a considerable localization or concentration of current exists.

It is among the objects of the present invention to provide a welding system which will avoid the difficulty described in the foregoing, and by which relatively rough unmachined surfaces may be effectively welded over relatively large surfaces.

Where it is sought to provide the welding energy necessary to weld comparatively large parts over a large surface area from an energy storage device, such as a storage condenser or bank of such condensers, it is found that the size and expense of the storage means become prohibitive, due to the large amount of energy required to effect a given weld over a large surface area.

It is among the objects of the present invention to provide a system in which a portion of the energy is supplied from an energy storage device, such as a storage condenser or a bank of such condensers, and the remainder of the energy is supplied at a lower energy level directly from commercial power lines.

The above and other objects and features of the invention will be made fully apparent to those skilled in the art from a consideration of the following detailed description taken in conjunction with the accompanying drawing in which:

Fig. 1 shows a wiring diagram of a system constructed in accordance with the present invention;

Fig. 2 is a set of curves illustrating certain operating characteristics of the invention; and Fig. 3 represents, on an enlarged scale, a pair of work pieces to be welded over relatively large areas, useful in explaining certain features of the present invention.

Referring to the drawing, reference numeral 5 indicates an electrical condenser adapted to be charged with direct current from a rectifier 6 to which alternating current may be supplied from a power supply line 7. The condenser 5 is adapted to be discharged by way of a controlled gaseous discharge device 8, such as an ignitron, through the primary winding 9 of a welding transformer 10. The secondary winding 11 of the transformer 10 has one end connected to one of the work pieces 12 and its other end connected to the other of the work pieces 13. The discharge of the condenser is initiated by means of an igniting impulse supplied to the control electrode, such as a resistance-immersion ignitor, of the tube 8. The igniting impulse for firing the tube 8 is supplied by a timing unit 16 controlled by push button 17.

The primary winding 9 of the transformer 10 may be supplied with alternating current directly from the power supply line 7 by way of a two-way switching device 18 which may comprise a pair of gaseous discharge devices arranged in a known manner to pass current in either direction when the control electrodes thereof are energized. In order that the switching device 18 may be energized in timed relation to the discharge of the condenser 5, energizing impulses are supplied thereto from the timing device 16 after a predetermined time delay from the supply of an energizing impulse to the control electrode of the tube 8.

In the operation of the system, assuming that the condenser 5 has been charged to a predetermined value from the source 6, an energizing impulse is supplied to the control electrode of the tube 8 from the timing unit 16 by closing the push button 17. The tube 8 becomes conductive, and the condenser 5 discharges through the welding circuit in the form of a unidirectional impulse of current of high potential having the general form indicated by the curve $I_c$ of Fig. 2.

The effect of the impulse of high voltage current upon the work pieces 12 and 13 may be understood by reference to Fig. 3, which shows, on a greatly enlarged scale, a small section of the contacting surfaces of the two work pieces. Such surfaces, unless they have been highly polished, have minute irregularities, including high points 21 and intervening depressions. Contact between the two work pieces is made wherever two of the projecting high points 21 happen to coincide. Thus, except at the contacting high points, a small space is left between the two work pieces. Where it is attempted to weld two such work pieces over a large area by passing alternating current therethrough, the current is concentrated at such contacting high points, and the heat is localized in areas wherever such contact happens to occur. This results in an overheating or burning of such local areas before the areas more remote therefrom have been sufficiently heated. By supplying a current impulse, as indicated by the curve $I_c$, which is of short duration and at a very high energy level, I have found that the high points may be exploded or flashed off, and the material thereof projected outwardly through the small space existing between the two work pieces, before this space can be closed by the normal pressure applied to the two work pieces. The projecting high points 21 having been flashed off, it is now possible for the work pieces 12 and 13 to come together under the normal pressure supplied thereto, these no longer being held apart by the projecting high points, and the two work pieces will be found to have closely corresponding surfaces over the major areas thereof. After the flashing off of the high points 21 and after the slight gap between the work pieces has been closed, alternating current may be supplied to the welding transformer to complete the welding operation. Such alternating welding current, as indicated by the curve $I_{ac}$, is supplied to the welding load at a predetermined time after the impulse of current from the storage condenser 5. The timing of the initiation of such alternating welding current is controlled by the timing unit 19 which, at a predetermined time after the supply of an igniting impulse to the tube 8, supplies a similar igniting impulse to the control electrode of the tubes comprising switching unit 18. It will be understood that the duration of the period of delay between the termination of the impulse of energy from the condenser 5, at the time $T_1$, and the initiation of the supply of alternating welding current, at the time $T_2$, will depend upon the time required to effect a good seating contact between the adjacent surfaces of the work pieces 12 and 13. This depends upon the mass of the two work pieces, since the inertia thereof must be overcome, and upon the pressure applied thereto. It will be understood that this time is but a few milliseconds in any event. The supply of alternating current should not coincide with the supply of the high energy impulse from the condenser 5, otherwise the current concentration and burning described occur before the projecting high points 21 can be flashed off.

It will be seen that the recharging of the condenser 5 may be initiated immediately after the completion of the discharge thereof at the time $T_1$, and may proceed while the alternating welding current is being supplied to the work, so that the condenser will be recharged immediately upon the completion of the weld and the system will be ready for the initiation of the second welding operation.

It will be appreciated that, although the condenser 5 supplies a welding impulse at a high energy level, the energy supplied by the condenser may constitute but a small portion of the total welding energy supplied to the work. The condenser 5 may, therefore, be of far less capacity than if this condenser were relied upon to supply the total energy required for effecting the welding operation. Accordingly, a relatively small capacitance is required to effect a single resistance weld between two surfaces of a relatively large area, the major portion of the energy being supplied directly from commercial power supply lines.

Although there has been herein described a preferred embodiment of the invention, other embodiments within the scope of the appended claims will be apparent to those skilled in the art from a consideration of the forms shown and the teachings hereof. Accordingly, a broad interpretation of the appended claims commensurate with the scope of the invention within the art is desired.

What is claimed is:

1. The method of welding two parts having rough surfaces in the areas at which the weld is to be effected which comprises bringing said surfaces of said parts into contact between the projecting high points of said surfaces and with a gap between intervening areas, passing a unidirectional impulse of current through said parts, said impulse being of sufficient intensity to flash off said high points and project the material thereof outwardly through said gap, closing said gap between said work pieces and thereafter passing an alternating current through said parts to complete the welding operation.

2. The method of welding two parts having rough surfaces in the areas at which the weld is to be effected which comprises bringing said surfaces of said parts into contact between the projecting high points of said surfaces and with a gap between intervening areas, passing a unidirectional impulse of current through said parts, said impulse being of sufficient intensity to flash off said high points and project the material thereof outwardly through said gap, closing said gap between said work pieces and thereafter passing an alternating current of lower intensity than said unidirectional impulse through said parts to complete the welding operation.

3. The method of welding two parts having rough surfaces in the areas at which the weld is to be effected which comprises charging an electrical condenser, bringing said surfaces of said parts into contact between the projecting high points of said surfaces and with a gap between intervening areas, passing a unidirectional impulse of current from said condenser through said parts, said impulse being of sufficient intensity to flash off said high points and project the material thereof outwardly through said gap, closing said gap between said work pieces and thereafter passing an alternating current of lower intensity than said unidirectional impulse through said parts to complete the welding operation.

4. A system for welding two parts having rough surfaces in the areas at which the weld is to be effected, comprising a storage condenser for supplying a unidirectional welding impulse through said parts of sufficient intensity to flash off the high points between said rough surfaces, a circuit for supplying alternating current through said parts, and timing means controlling said circuit for initiating said supply of alternating current after a predetermined time delay from the initiation of said unidirectional welding impulse from said condenser.

5. A system for welding two parts having rough surfaces in the areas at which the weld is to be effected, comprising a storage condenser for supplying a unidirectional welding impulse through said parts of sufficient intensity to flash off the high points between said rough surfaces, a circuit for supplying alternating current of lower intensity than said unidirectional impulse through said parts, and timing means controlling said circuit for initiating said supply of alternating current after a predetermined time delay from the initiation of said unidirectional welding impulse from said condenser.

JOHN W. DAWSON.

REFERENCES CITED

The following references are of record in the file of this patent:

UNITED STATES PATENTS

| Number | Name | Date |
|---|---|---|
| 1,976,342 | Heineman | Oct. 9, 1934 |
| 2,085,583 | Hanson | June 29, 1937 |
| 2,287,540 | Vang | June 23, 1942 |
| 2,306,229 | Somerville | Dec. 22, 1942 |